US011873985B2

(12) United States Patent
Tsai

(10) Patent No.: US 11,873,985 B2
(45) Date of Patent: Jan. 16, 2024

(54) ILLUMINATION GRIP FOR SPORTING AND RECREATIONAL EQUIPMENT

(71) Applicant: Medal Sports (Taiwan) Corporation, Taipei (TW)

(72) Inventor: Kevin Chunhao Tsai, Kaohsiung (TW)

(73) Assignee: MEDAL SPORTS (TAIWAN) CORPORATION, Taipei (TW)

( * ) Notice: Subject to any disclaimer, the term of this patent is extended or adjusted under 35 U.S.C. 154(b) by 0 days.

(21) Appl. No.: 17/724,026

(22) Filed: Apr. 19, 2022

(65) Prior Publication Data

US 2022/0341586 A1 Oct. 27, 2022

Related U.S. Application Data

(60) Provisional application No. 63/180,316, filed on Apr. 27, 2021.

(51) Int. Cl.

*F21V 33/00* (2006.01)
*F21V 23/04* (2006.01)
*F21S 9/03* (2006.01)
*A63B 9/00* (2006.01)
*F21V 17/12* (2006.01)
*F21Y 115/10* (2016.01)

(52) U.S. Cl.

CPC .............. *F21V 33/008* (2013.01); *A63B 9/00* (2013.01); *F21S 9/037* (2013.01); *F21V 17/12* (2013.01); *F21V 23/04* (2013.01); *A63B 2009/006* (2013.01); *A63B 2225/74* (2020.08); *F21Y 2115/10* (2016.08)

(58) Field of Classification Search

CPC ..... F21V 33/008; A63B 9/00; A63B 2225/74; A63B 2009/006

See application file for complete search history.

(56) References Cited

U.S. PATENT DOCUMENTS

| | | | | |
|---|---|---|---|---|
| 9,030,829 B2 * | 5/2015 | Ma | H05K 5/0086 | 362/102 |
| 2007/0211450 A1 * | 9/2007 | You | A45B 3/04 | 362/245 |
| 2009/0197740 A1 * | 8/2009 | Julskjaer | A63G 33/00 | 715/236 |

FOREIGN PATENT DOCUMENTS

| | | | |
|---|---|---|---|
| DE | 202012008293 U1 * | 11/2012 | A63H 33/22 |
| EP | 3546034 A1 * | 10/2019 | A63B 71/0619 |
| GB | 2444707 A * | 6/2008 | A63B 9/00 |
| KR | 101588970 B1 * | 1/2016 | F21V 15/01 |
| WO | WO-2017187264 A1 * | 11/2017 | E04H 15/10 |

(Continued)

OTHER PUBLICATIONS

Park, Sang Wook, "Flashlight", Jan. 27, 20116, Document ID "KR 101588970 B1", merged English translation text. (Year: 2016).*

(Continued)

*Primary Examiner* — Alan B Cariaso

(74) *Attorney, Agent, or Firm* — Dickinson Wright PLLC

(57) ABSTRACT

A grip is suitable for sporting or recreational equipment having bars that intersect to form nodes. Fasteners, such as a bolt, washer and nut, can secure the bars together at each respective node. Each grip can include a grip body secured to respective ones of the nodes. Each grip body can have a hole through which a respective bolt extends, and a light assembly recess. A light assembly can be mounted in the respective light assembly recess of the grip body, and the light assembly can illuminate the grip.

19 Claims, 6 Drawing Sheets

(56) References Cited

FOREIGN PATENT DOCUMENTS

WO WO-2020010268 A1 * 1/2020 ......... A63B 69/0048

OTHER PUBLICATIONS

Abu Fana R, "Foldable Spherical Structure Made Of Colored Plastic With Lighting", Sep. 20, 2012, Document ID "DE 202012008293 U1", merged English translation text. (Year: 2012).*

* cited by examiner

ILLUMINATION GRIP FOR SPORTING AND RECREATIONAL EQUIPMENT

This application claims priority to and the benefit of U.S. Prov. Pat. App. No. 63/180,316, filed Apr. 27, 2021, which is incorporated herein by reference in its entirety.

BACKGROUND

Field of the Disclosure

The present disclosure relates in general to hand or foot grips for sporting and recreational activity. More specifically, various embodiments include apparatus and methods for adapting lighted caps in hand or foot grips of a climbing structure to improve the climbing experience of the climber and overall appearance of the climbing structure.

Description of the Prior Art

Hand or foot grips are frequently used on climbing walls and structures to simulate natural hand or foot holds found when rock or tree climbing. Some climbing structures, such as geometric domes, include grips at bar attachment points to aid climbers. These grips are typically attached to the climbing structure using the same hardware that connects the bars of the structure. As a result, these grips often include a center hole to accommodate the bolts or other hardware used to secure the bars of the structure. Conventionally, these holes in the grips of climbing structures remain open and unused after the construction of these structures. Accordingly, apparatus and methods are needed to utilize the holes of grips of climbing structures after construction.

SUMMARY

Embodiments of a grip are disclosed. The grip is suitable for a sporting or recreational equipment having a plurality of bars that intersect to form nodes, a respective fastener set having a bolt, washer and nut fastened to and securing the bars together at each respective node. A plurality of the grips can be included. Each grip can comprise a grip body secured to respective ones of at least some of the nodes. Each grip body can have a hole through which a respective bolt extends, and a light assembly recess. A light assembly can be mounted in the respective light assembly recess of the grip body, and the light assembly can illuminate the grip.

BRIEF DESCRIPTION OF THE DRAWINGS

The drawings disclose examples of a grip for sporting and recreational equipment, such as but not limited to, a dome playset, in accordance with various embodiments.

Before one or more embodiments are described in detail, one skilled in the art will appreciate that they are not limited in its application to the details of construction, the arrangements of components, and the arrangement of steps set forth in the following detailed description or illustrated in the drawings and descriptions. Rather, they are capable of other embodiments and of being practiced or being carried out in various ways. Also, it is to be understood that the phraseology and terminology used herein is for the purpose of description and should not be regarded as limiting.

DETAILED DESCRIPTION

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings.

Figure 1:
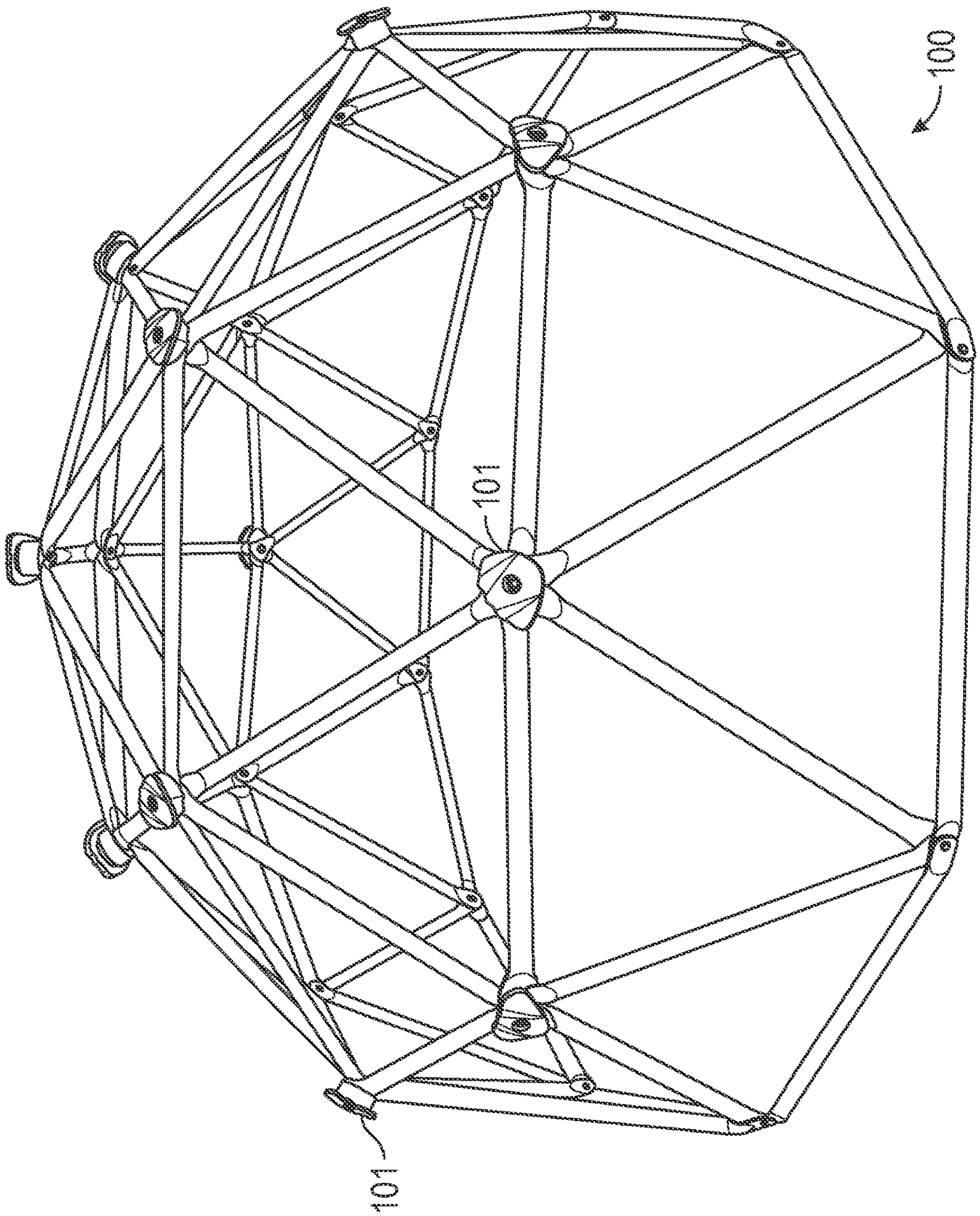
FIG. 1 is an isometric view of sporting or recreational equipment having an embodiment of grips.
Figure 2:
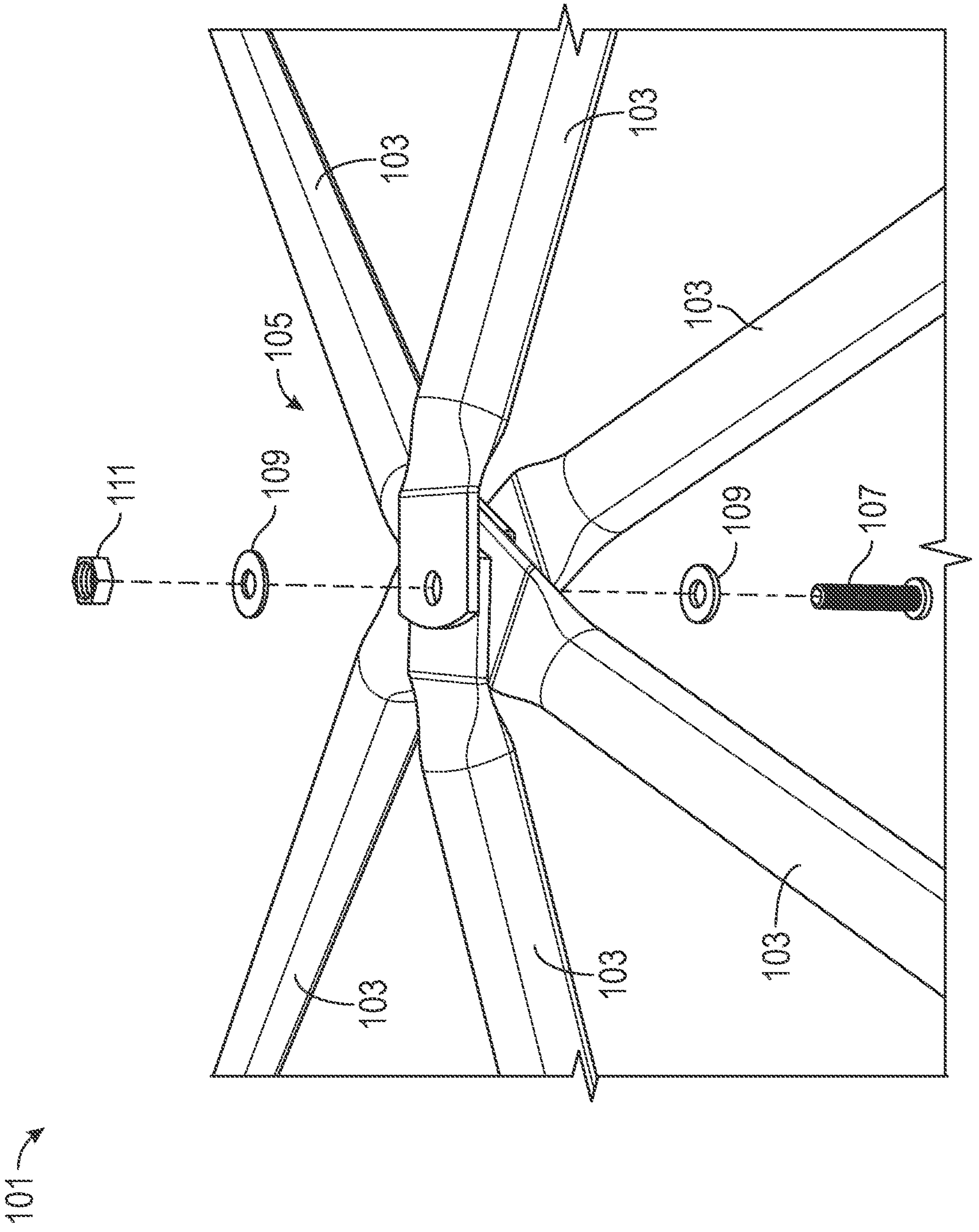
FIG. 2 is an enlarged, exploded isometric view of an embodiment of the equipment.
Figure 3:
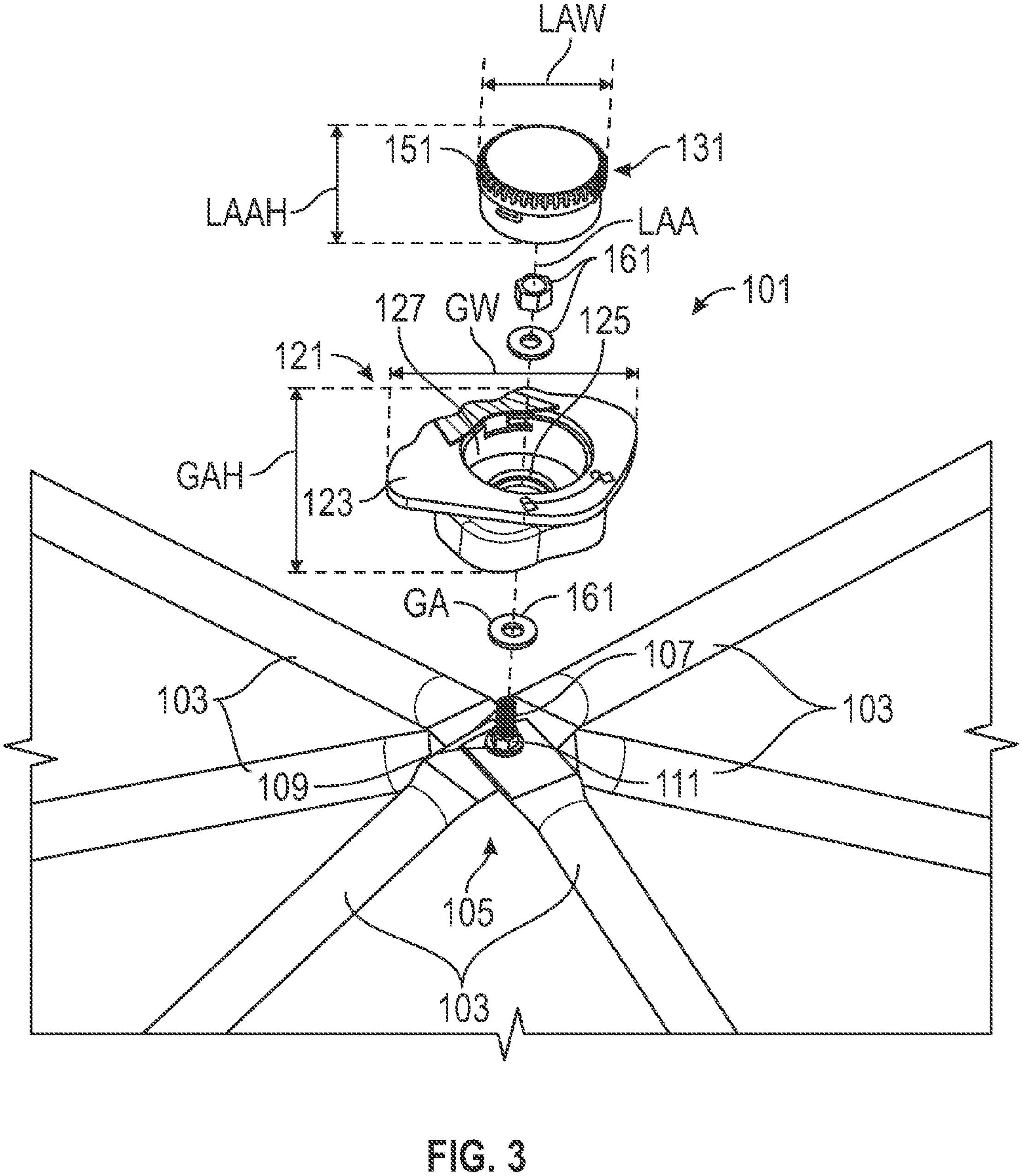
FIG. 3 is an enlarged, exploded isometric view of an embodiment of the grip and equipment.
Figure 4:
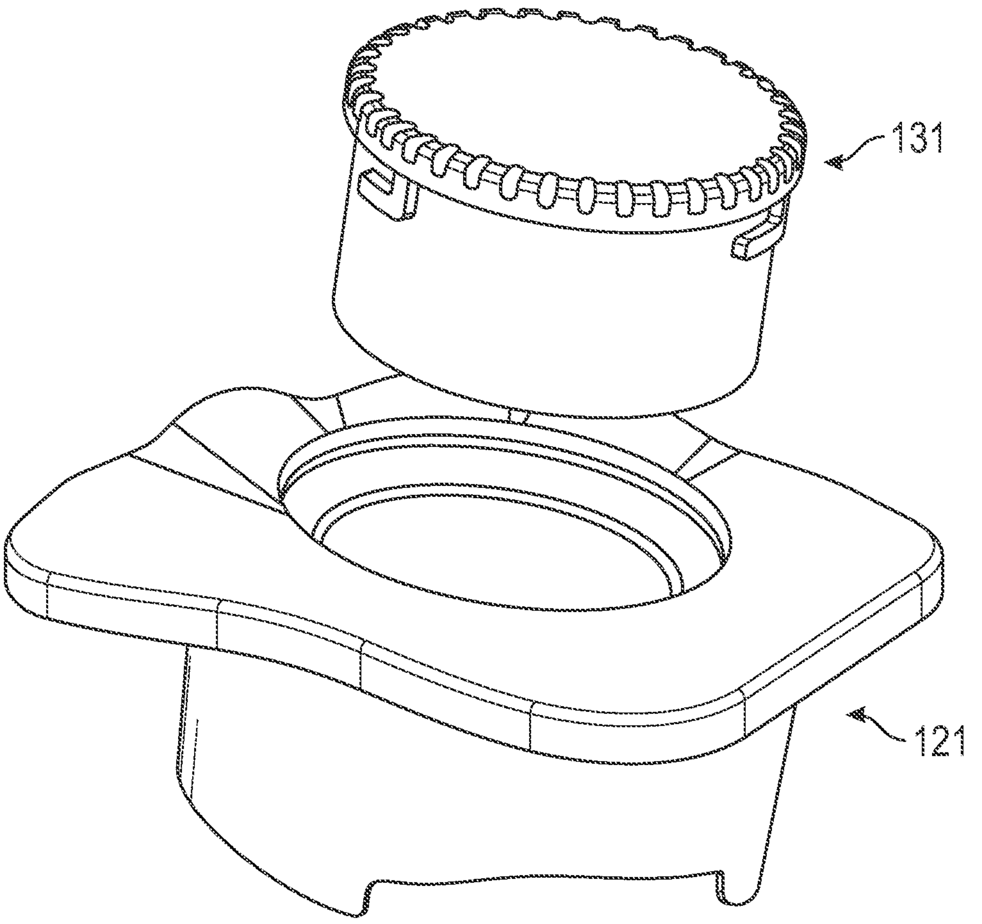
FIG. 4 is an exploded view of an embodiment of the grip.
Figure 5:
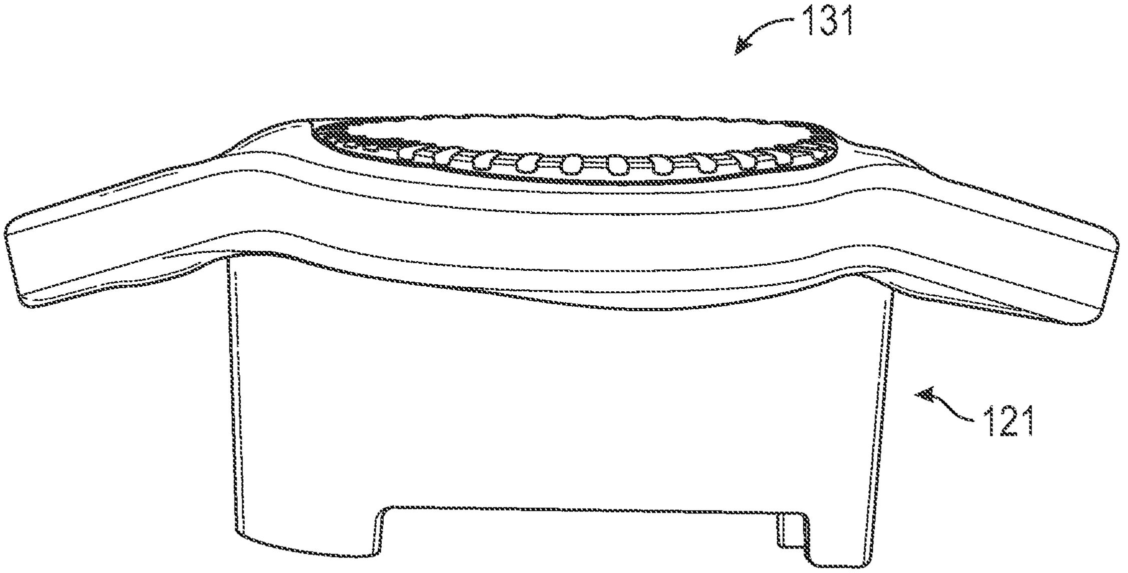
FIG. 5 is an assembled version of the grip of FIG. 4.
Figure 6:
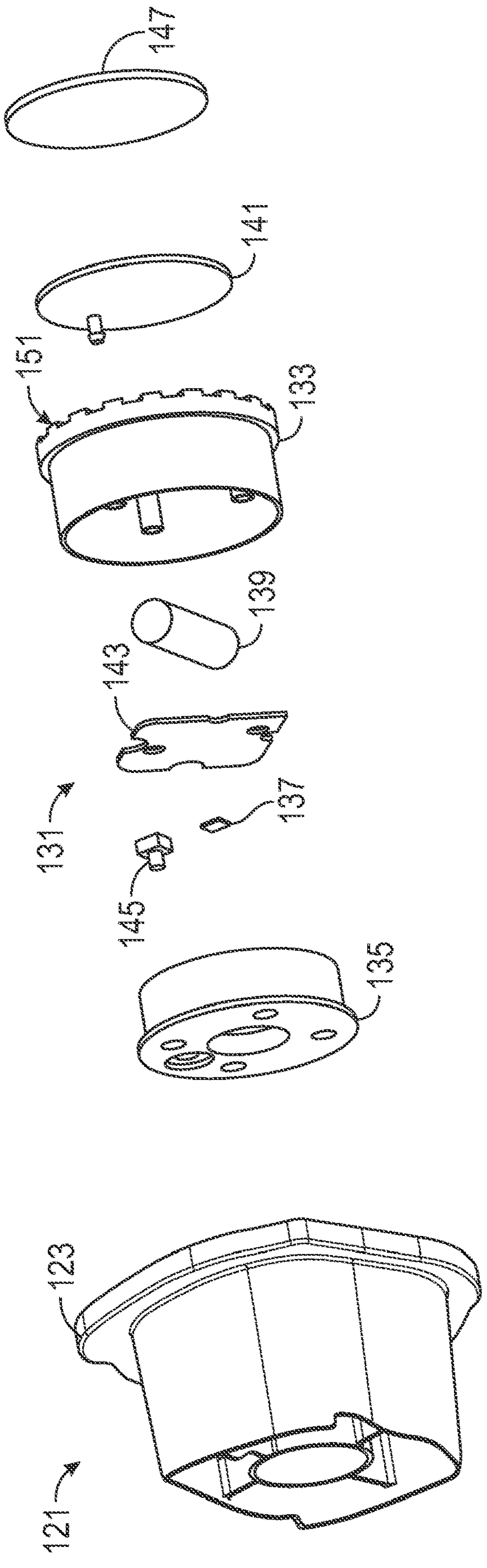
FIG. 6 is an exploded view of another embodiment of the grip.
Figure 8:
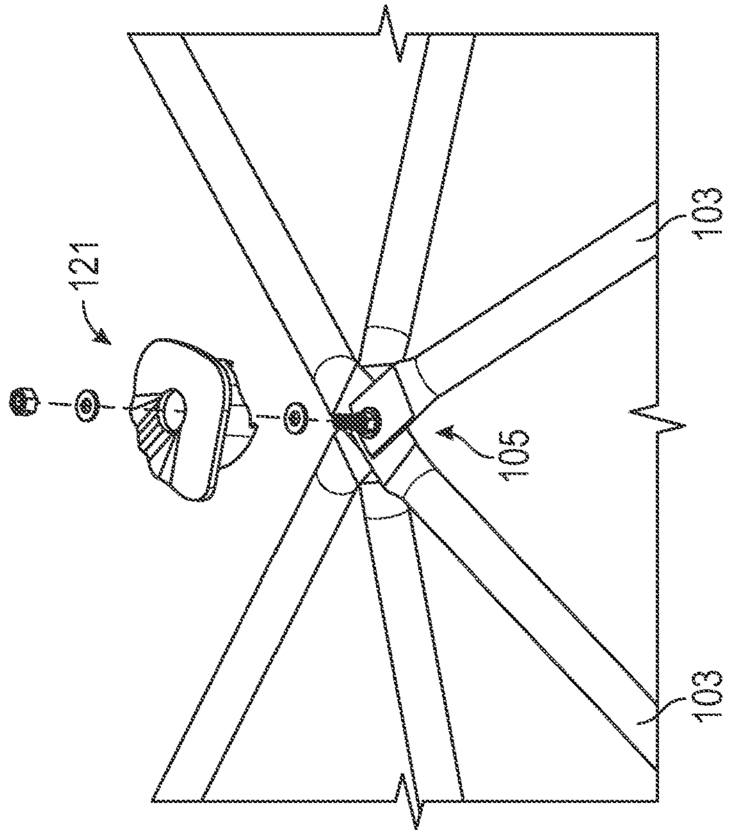
FIG. 8 is an exploded isometric view of the equipment and grip of FIG. 7.
Figure 7:
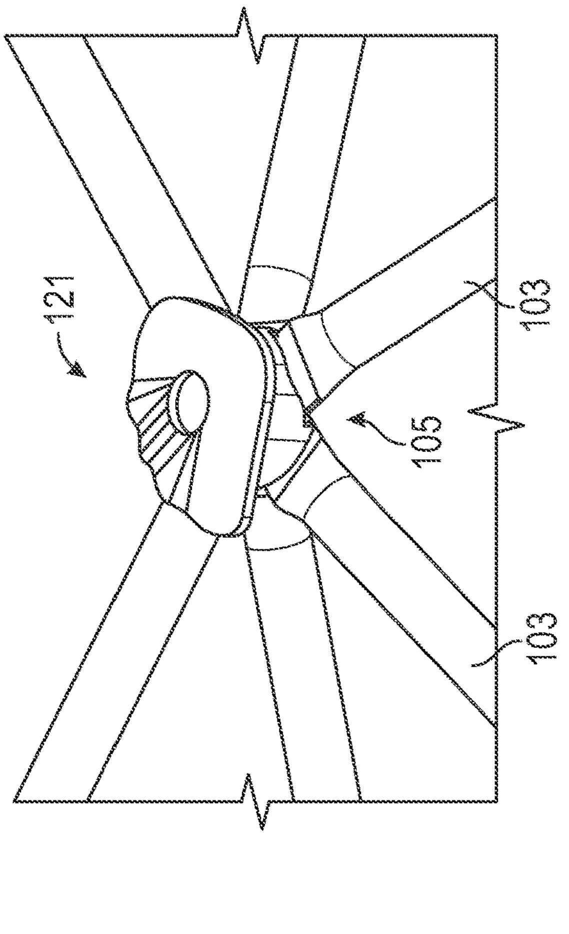
FIG. 7 is an isometric view of a portion of the equipment with another embodiment of the grip.

For example, FIGS. 1-8 disclose various embodiments of a grip 121. For example, FIGS. 1, 7 and 8 depict one version of the grip 121, and FIGS. 3-6 depict another version of the grip 121. The grip 121 can be used on a sporting or recreational equipment 100 having a plurality of bars 103 that intersect to form nodes 105. A respective fastener set can include a bolt 107, one or more washers 109 (e.g., two shown) and nut 111 fastened to and securing the bars 103 together at each respective node 105.

Embodiments of each grip 121 can include a grip body 123 that can be secured to respective ones of at least some of the nodes 105. Each grip body 123 can have a hole 125 through which a respective bolt 107 extends. Versions of each grip body 123 also can have a light assembly recess 127. A light assembly 131 can be mounted in the respective light assembly recess 127 of the grip body 123. The light assembly 131 can be configured to illuminate the respective grip 121. The hole 125 in each grip body 123 can be a center hole. The hole 125 in each grip body 123 can be coaxial with the respective light assembly recess 127.

As shown in FIG. 6, embodiments of each light assembly 131 can include a top 133, a bottom 135, a light source 137 and a power source 139. In one version, the light source 137 can comprise one or more light emitting diodes (LED). Other examples can further include a mount plate 141, a printed circuit board (PCB) 143 to control the light source 137, and a power switch 145 to control the power source 139. The top 133 and bottom 135 can be mounted together to form an enclosure to protect the light source 137, power source 139 and PCB 143. Embodiments of the power source 139 can comprise a battery. Other embodiments of the power source 139 can comprise a solar panel 147, which can be used alone or in conjunction with the battery. The solar panel 147 can be mounted to the mount plate 141, which can be mounted to the top 133.

Embodiments of each light assembly 131 can include a perimeter 151. The light source 137 can be configured to illuminate at least a portion of the perimeter 151. In some versions, each light assembly recess 127 and each light assembly 131 can be cylindrical in shape, such that the perimeter 151 of each light assembly 131 can be a circumference. In some examples, an entirety of each circumference can be configured to be illuminated.

Versions of the exterior of each light assembly 131 can be flush (FIG. 5) or substantially flush with the respective grip body 123. The bolt 107 of each node 105 can secure the respective light assembly 131 to the respective grip 123, such that the respective bars 103, grip 121 and light assembly 131 are secured together with said bolt 107. Moreover, each grip 121 can be secured to a respective bolt 107 at each node 105 with one or more additional washers and nut 161. Alternatively, the light assembly 131 can be secured via complimentary twist-lock mechanisms (FIGS. 4-5) with the light assembly recess 127 of the grip 123.

In some embodiments, the light assembly 131 has a light assembly axis (LAA) and a light assembly width (LAW) that is transverse to the light assembly axis, the grip 121 has a grip axis (GA) and a grip width (GW) that is transverse to the grip axis, and a ratio of GW:LAW can be in a range of at least about 4:1 to at least about 2:1. Versions of the LAA and GA can be coaxial. In other examples, the grip 121 can have a grip axial height (GAH), the light assembly has light assembly axial height (LAAH), and a ratio of GAH:LAAH can be in a range of 2:1 to 4.1.

One or more grips can be located at one or more contact points for a user to hold onto. The grip can include a center hole that accommodates a bolt, washer, and nut for securing the grip to the sporting and recreational equipment, such as but not limited to, a dome playset.

Optionally, the grip includes an inserted cylindrical LED cap that can be illuminated. The cylindrical LED cap can fit inside the center hole hiding the bolt, washer, and nut in the grip with LED lights along the circumference of the grip, in one example. The cylindrical LED cap can include the LED lights along the exposed circular edge that appear as a circular light when lit.

Other embodiments can include one or more of the following items.

1. A plurality of grips, each grip comprising:
   - a grip body for sporting or recreational equipment having a plurality of bars that intersect to form nodes, a respective fastener set to secure the bars together at each respective node:
   - each grip body is configured to be secured to respective ones of at least some of the nodes, and each grip body comprises a light assembly recess; and
   - a light assembly mounted in the respective light assembly recess of each grip body, and the light assembly is configured to illuminate the respective grip.
2. The grips wherein each light assembly comprises:
   - a top;
   - a bottom;
   - a light source;
   - a power source;
   - a mount plate;
   - a printed circuit board (PCB) to control the light source; and
   - a power switch to control the power source.
3. The grips wherein the light source comprises a light emitting diode (LED).
4. The grips wherein the power source comprises a battery.
5. The grips wherein the power source comprises a solar panel.
6. The grips wherein the solar panel is mounted to the mount plate.
7. The grips wherein the solar panel is mounted to the mount plate which is mounted to the top.
8. The grips wherein the mount plate is mounted to the top and the top is mounted to the bottom.
9. The grips wherein each light assembly has a perimeter and the light source is configured to illuminate at least a portion of the perimeter.
10. The grips wherein each light assembly recess and each light assembly is cylindrical in shape and the perimeter of each light assembly is a circumference.
11. The grips wherein an entirety of each circumference is configured to be illuminated.
12. The grips wherein the top and bottom form an enclosure to protect the light source, power source and PCB therein.
13. The grips wherein each grip body comprises a hole.
14. The grips wherein the hole in each grip body is centrally coaxial with the respective light assembly recess.
15. The grips wherein an exterior of each light assembly is flush or substantially flush with the respective grip body.
16. The grips wherein the fastener set of each node is configured to secure the respective light assembly to the respective grip body, such that respective bars, grip bodies and light assemblies are secured together.
17. The grips wherein the light assembly has a light assembly axis (LAA) and a light assembly width (LAW) that is transverse to the light assembly axis, the grip has a grip axis (GA) and a grip width (GW) that is transverse to the grip axis, and a ratio of GW:LAW is in a range of at least about 4:1 to at least about 2:1.
18. The grips wherein the grip has grip axial height (GAH), the light assembly has light assembly axial height (LAAH), and a ratio of GAH:LAAH is in a range of 2:1 to 4.1.
19. The grips wherein each grip is secured to each respective node with a washer and nut.
20. A grip, comprising:
    - a grip body configured to be secured to a sporting or recreational equipment having a plurality of bars that intersect to form nodes, a respective fastener set having a bolt, washer and nut fastened to and securing the bars together at each respective node;
    - the grip body having a hole which is configured for the bolt to extend there through, and a light assembly recess; and
    - a light assembly mounted in the light assembly recess of the grip body, wherein the light assembly is configured to illuminate the grip.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

Still other examples can include the following.

A grip for sporting and recreational equipment, comprising: a hole that accommodates a bolt, washer, and nut for securing the grip to sporting and recreational equipment.

The grip further comprising an inserted cylindrical LED cap having a light source that fits inside the hole hiding the bolt, washer, and nut in the grip with LED lights along the circumference of the circle, wherein the cylindrical LED cap includes the LED lights along the exposed circular edge that appear as a circular light when lit.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:

1. A plurality of grips, each grip comprising:

a grip body for sporting or recreational equipment having a plurality of bars that intersect to form nodes, a respective fastener set to secure the bars together at each respective node:

each grip body is configured to be secured to respective ones of at least some of the nodes, and each grip body comprises a light assembly recess; and a light assembly mounted in the respective light assembly recess of each grip body, the light assembly comprises a top and a solar panel as a power source mounted to the top, and the light assembly is configured to illuminate the respective grip.

2. The grips of claim 1, wherein each light assembly comprises:

a bottom;

a light source;

a mount plate;

a printed circuit board (PCB) to control the light source; and a power switch to control the power source.

3. The grips of claim 2, wherein the light source comprises a light emitting diode (LED).

4. The grips of claim 2, wherein the power source further comprises a battery.

5. The grips of claim 2, wherein the solar panel is mounted to the mount plate.

6. The grips of claim 2, wherein the mount plate is mounted to the top and the top is mounted to the bottom.

7. The grips of claim 2, wherein the top and bottom form an enclosure to protect the light source, power source and PCB therein.

8. The grips of claim 1, wherein each light assembly has a perimeter and the light source is configured to illuminate at least a portion of the perimeter.

9. The grips of claim 1, wherein each light assembly recess and each light assembly is cylindrical in shape and the perimeter of each light assembly is a circumference.

10. The grips of claim 9, wherein an entirety of each circumference is configured to be illuminated.

11. The grips of claim 1, wherein each grip body comprises a hole.

12. The grips of claim 11, wherein the hole in each grip body is centrally coaxial with the respective light assembly recess, which is coaxial with a respective light assembly.

13. The grips of claim 1, wherein an exterior of each light assembly is flush with an exterior of the respective grip body.

14. The grips of claim 1, wherein the fastener set of each node is configured to secure the respective light assembly to the respective grip body, such that respective bars, grip bodies and light assemblies are secured together.

15. The grips of claim 1, wherein the light assembly has a light assembly axis (LAA) and a light assembly width (LAW) that is transverse to the light assembly axis, the grip has a grip axis (GA) and a grip width (GW) that is transverse to the grip axis, and a ratio of GW:LAW is in a range of at least about 4:1 to at least about 2:1.

16. The grips of claim 15, wherein the grip has grip axial height (GAH), the light assembly has light assembly axial height (LAAH), and a ratio of GAH:LAAH is in a range of 2:1 to 4.1.

17. The grips of claim 1, wherein each grip is secured to each respective node with a washer and nut.

18. A grip, comprising:

a grip body configured to be secured to a sporting or recreational equipment having a plurality of bars that intersect to form nodes, a respective fastener set having a bolt, washer and nut fastened to and securing the bars together at each respective node;

the grip body having a hole which is configured for the bolt to extend there through, and the grip body comprises a light assembly recess and a hole;

a light assembly mounted in the light assembly recess of the grip body, wherein the light assembly is configured to illuminate the grip, and an exterior of each light assembly is flush or substantially flush with an exterior of the respective grip body; and the hole in each grip body is centrally coaxial with the respective light assembly recess, which is coaxial with a respective light assembly.

19. A grip, comprising:

a grip body configured to be secured to a sporting or recreational equipment having a plurality of bars that intersect to form nodes, a respective fastener set having a bolt, washer and nut fastened to and securing the bars together at each respective node;

the grip body having a hole which is configured for the bolt to extend there through, and the grip body comprises a light assembly recess and a hole;

a light assembly mounted in the light assembly recess of the grip body, the light assembly is configured to illuminate the grip, and the grip has grip axial height (GAH), the light assembly has light assembly axial height (LAAH), and a ratio of GAH:LAAH is in a range of 2:1 to 4.1.

* * * * *